(12) United States Patent
Tsai

(10) Patent No.: US 7,517,207 B2
(45) Date of Patent: Apr. 14, 2009

(54) INJECTION MOLDING DEVICE

(75) Inventor: Ming-Chiang Tsai, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 244 days.

(21) Appl. No.: 11/448,573

(22) Filed: Jun. 7, 2006

(65) Prior Publication Data

US 2007/0104825 A1    May 10, 2007

(30) Foreign Application Priority Data

Nov. 4, 2005    (CN)    ............ 2005 1 0101030

(51) Int. Cl.
    B29C 45/26    (2006.01)
(52) U.S. Cl. ............... 425/190; 425/576; 425/588; 425/808
(58) Field of Classification Search ......... 425/575–576, 425/588–589, 572, 577, 582, 808, 190, 192 R, 425/193, 195
    See application file for complete search history.

(56) References Cited

U.S. PATENT DOCUMENTS

| 3,196,485 | A | * | 7/1965 | Battenfeld et al. | ........ 425/408 |
| 4,161,378 | A | * | 7/1979 | Strawson et al. | ........ 425/3 |
| 4,443,396 | A | * | 4/1984 | Breher | ........ 264/136 |
| 4,685,881 | A | * | 8/1987 | Sasaki | ........ 425/562 |
| 4,812,116 | A | * | 3/1989 | Abrams | ........ 425/547 |
| 4,828,769 | A | * | 5/1989 | Maus et al. | ........ 264/1.31 |
| 4,959,000 | A | * | 9/1990 | Giza | ........ 425/116 |
| 4,959,007 | A | * | 9/1990 | Okuyama | ........ 425/577 |
| 5,094,603 | A | * | 3/1992 | Gellert | ........ 425/130 |
| 5,112,556 | A | * | 5/1992 | Miller | ........ 264/279 |
| 5,518,389 | A | * | 5/1996 | Nonomura et al. | ........ 425/144 |
| 5,660,758 | A | * | 8/1997 | McCullough | ........ 249/59 |
| 5,731,013 | A | * | 3/1998 | vanderSanden | ........ 425/183 |
| 6,019,929 | A | * | 2/2000 | Noggle et al. | ........ 264/297.2 |
| 6,024,551 | A | * | 2/2000 | Yamaguchi | ........ 425/116 |
| 6,355,190 | B1 | * | 3/2002 | Ojio et al. | ........ 264/1.1 |
| 6,599,115 | B2 | * | 7/2003 | Chalcraft et al. | ........ 425/556 |
| 6,746,231 | B1 | * | 6/2004 | Benenati | ........ 425/547 |
| 7,175,419 | B2 | * | 2/2007 | Babin | ........ 425/564 |
| 7,210,917 | B2 | * | 5/2007 | Lai et al. | ........ 425/130 |
| 2002/0167115 | A1 | * | 11/2002 | Tanaka | ........ 264/328.1 |
| 2006/0038319 | A1 | * | 2/2006 | Arai et al. | ........ 264/251 |

FOREIGN PATENT DOCUMENTS

| JP | 62097814 | A | * | 5/1987 |
| JP | 63051111 | A | * | 3/1988 |
| JP | 63145007 | A | * | 6/1988 |
| JP | 63179720 | A | * | 7/1988 |

* cited by examiner

*Primary Examiner*—Steven P Griffin
*Assistant Examiner*—Seyed M Malekzadeh
(74) *Attorney, Agent, or Firm*—Steven M. Reiss

(57) ABSTRACT

An injection molding device (100) includes an upper mold (30), a core insert (50), and a lower mold (70). The upper mold defines a main flow passage (311) and a cylindrical receiving cavity (331) communicating with the main flow passage. The core insert is rotatably received in the cylindrical receiving cavity and defines a secondary flow passage (57) communicating with the main flow passage and at least one upper half molding cavity (531). The lower mold defines at least one lower half molding cavity (711) cooperating with the upper half molding cavity to form a full molding cavity.

12 Claims, 7 Drawing Sheets

INJECTION MOLDING DEVICE

TECHNICAL FIELD

The present invention relates generally to injection molding devices, and more particularly to injection molding devices for molding plastic lens elements by injection molding.

BACKGROUND

Lenses used in digital cameras typically include glass lenses and plastic lenses. Plastic lenses are generally produced by an injection mold. In general, an injection mold used for an injection molding machine includes a mold body including a first template and a second template joined to each other in such a manner as to allow their separation. The mold body defines a cavity (a space which can be filled with molten plastic) of a configuration corresponding to that of an article to be molded, a flow passage through which molten plastic can flow through toward the cavity, and a gate through which the molten plastic flowing through the plastic flow passage can be injected into the cavity. At least one of the first and second templates is supported in such a manner as to be displaceable in a direction perpendicular to a parting face or line therebetween, so that relative displacement between the first template and the second template permits the mold body to be opened.

During the molding process, the first and second templates are pressed against each other and then clamped together using any suitable clamping mechanism to close the mold body. Then, molten plastic is injected through the gate into the cavity, resulting in it being molded into a molded article. After the molding is finished, the first and second templates are separated from each other, so that the molded article may be removed from the mold body.

Referring to FIG. 1, a typical injection mold 10 for molding plastic lenses includes an upper molding body 11 and a lower molding body 13. The upper molding body 11 defines a main runner 111 in a middle portion thereof. The injection mold defines two sub-runners 131 and two molding cavities 133 between the upper molding body 11 and the lower molding body 13.

In use, molten plastic is injected into the two molding cavities 133 through the main runner 111 and the two sub-runners 131. Because the main runner 111 is defined in the upper molding body 11, the molten plastic should be injected into the two molding cavities 133 from one side thereof. As a result, the molten plastic in the molding cavities 133 has an asymmetrical rate of cooling, and plastic lenses formed in the molding cavities 133 are asymmetrical as a result. In addition, gate (i.e. extra matter) formed in the sub-runners 131 connects the plastic lenses, and this gate must be cut off with a cutting machine. Cutting off the gate from the plastic lenses is tends to adversely impact the precision of the plastic lenses. Plastic lenses require precision molding, therefore, in order to mold each lens to a high degree of precision, it is important that the molten plastic is evenly and reliably fed into every corer of the cavity without leaving gate in the sub-runners 131.

Accordingly, what is needed is a new injection molding device, which is able to mold an accurate lens without influencing the lens configuration.

SUMMARY

In one preferred embodiment, an injection molding device includes an upper mold, a core insert, and a lower mold. The upper mold defines a main flow passage, and a cylindrical receiving cavity communicating with the main flow passage. The core insert is rotatably received in the cylindrical receiving cavity and defines a secondary flow passage communicating with the main flow passage and at least one upper half molding cavity. The lower mold defines at least one lower half molding cavity cooperating with the upper half molding cavity to form a full molding cavity.

Other advantages and novel features of a preferred embodiment of the present injection molding device and its applications will become more apparent from the following detailed description when taken in conjunction with the accompanying drawings.

BRIEF DESCRIPTION OF THE DRAWINGS

Many aspects of the injection molding device and their applications can be better understood with reference to the following drawings. The components in the drawings are not necessarily drawn to scale, the emphasis instead being placed upon clearly illustrating the principles of the injection molding device. Moreover, in the drawings, like reference numerals designate corresponding parts throughout the several views.

DETAILED DESCRIPTION OF PREFERRED EMBODIMENTS

Figure 1:
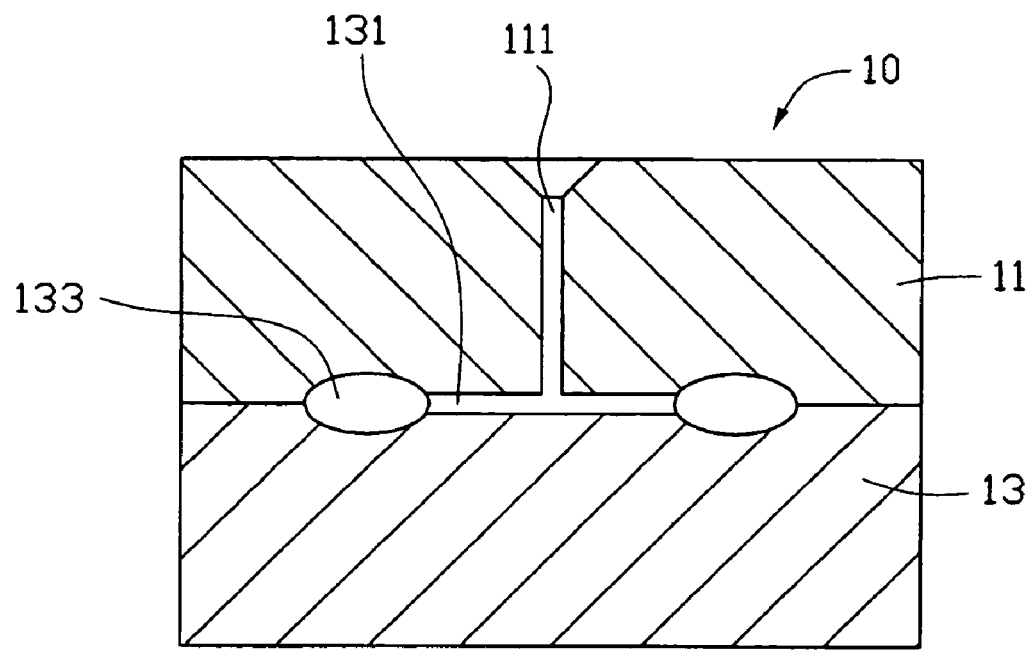
FIG. 1 is an isometric view of a typical injection mold.
Figure 2:
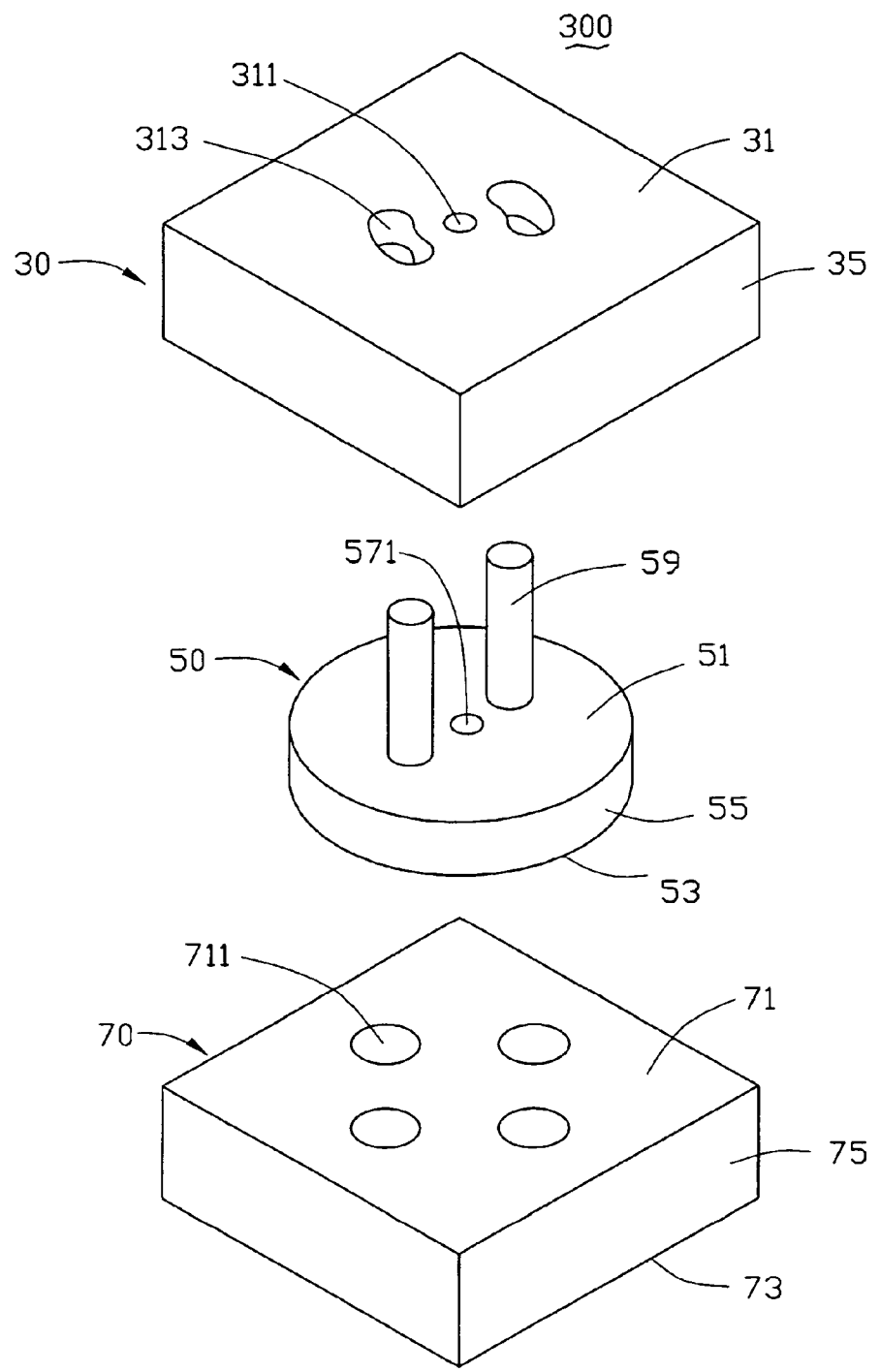
FIG. 2 is an exploded, isometric view of an injection molding device according to a preferred embodiment of the present invention.

Referring to FIG. 2, in a preferred embodiment, an injection molding device 300 for molding plastic lens elements includes an upper mold 30, a core insert 50, and a lower mold 70.

Figure 3:
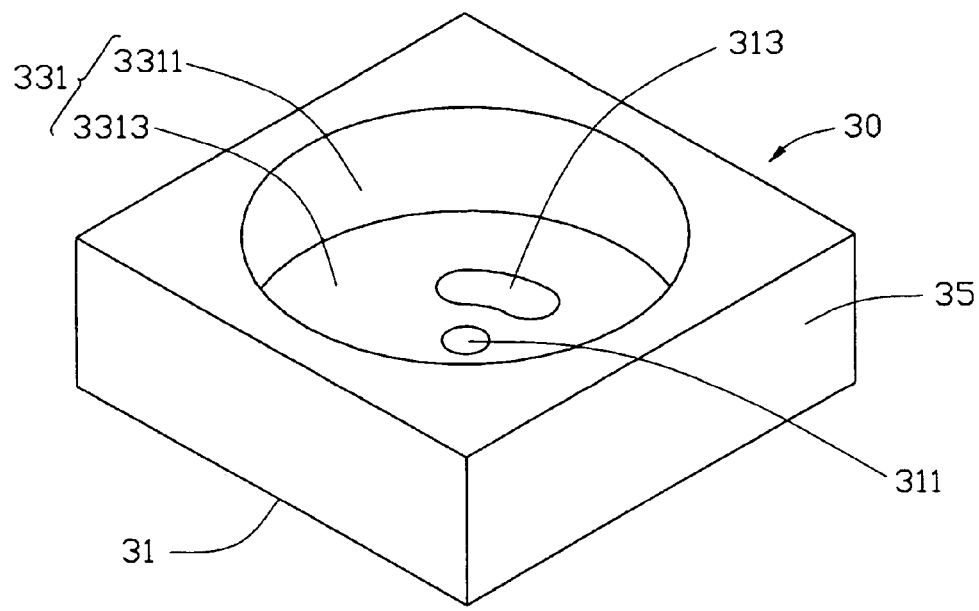
FIG. 3 is an isometric view of an upper mold shown in FIG. 2.

Referring also to FIG. 3, the upper mold 30 is substantially a cuboid, including an upper wall 31, and a plurality of side walls 35. The upper wall 31 connects with the side walls 35 so as to form a cylindrical receiving cavity 331. The receiving cavity 331 is cooperatively defined by a cylindrical inner surface 3311 of the sidewalls 35 and a round bottom surface 3313 of the upper wall 31. The upper wall 31 defines a main flow passage 311 in the middle and two adjusting holes 313 adjacent to the main flow passage 311. The main flow passage 311 and the two adjusting holes 313 run perpendicularly through the upper wall 31 so as to communicate with the cylindrical receiving cavity 331. The two adjusting holes 313 each have an arc-shaped cross-section.

Figure 4:
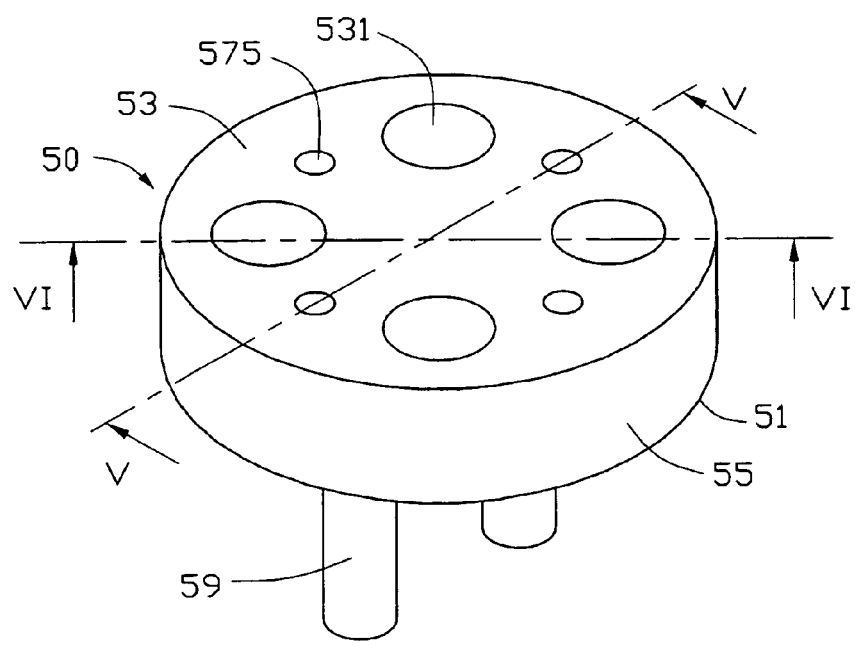
FIG. 4 is an isometric view of a core insert shown in FIG. 2.
Figure 5:
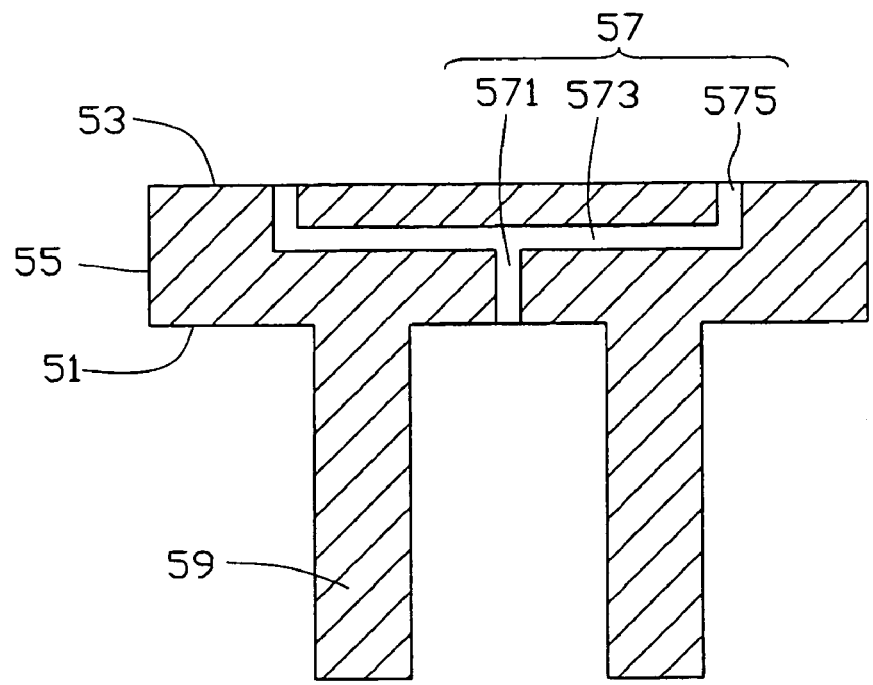
FIG. 5 is a cross-sectional view of FIG. 4, taken along the line V-V thereof.

Referring also to FIGS. 4-5, the core insert 50 includes a cylindrical block which includes an upper end surface 51, a lower end surface 53 and a round side surface 55. The core insert 50 is rotatably received in the cylindrical receiving cavity 331 and is movable along an axis of the core insert. The core insert 50 defines a secondary flow passage 57. The secondary flow passage 57 has an upright passage portion 571, four horizontal passage portions 573, and four feed passage portions 575. The upright passage portion 571 is defined in the core insert 50 and runs perpendicularly through the middle of the upper end surface 51. The four horizontal passage portions 573 are formed in parallel to the lower end surface 53 and each horizontal passage portion 573 communicates with one end of the upright passage portion 571. The four feed passage portions 575 run perpendicularly through the lower end surface 53, and each feed passage portion 575 communicates with one of the horizontal passage portions 573.

Figure 6:
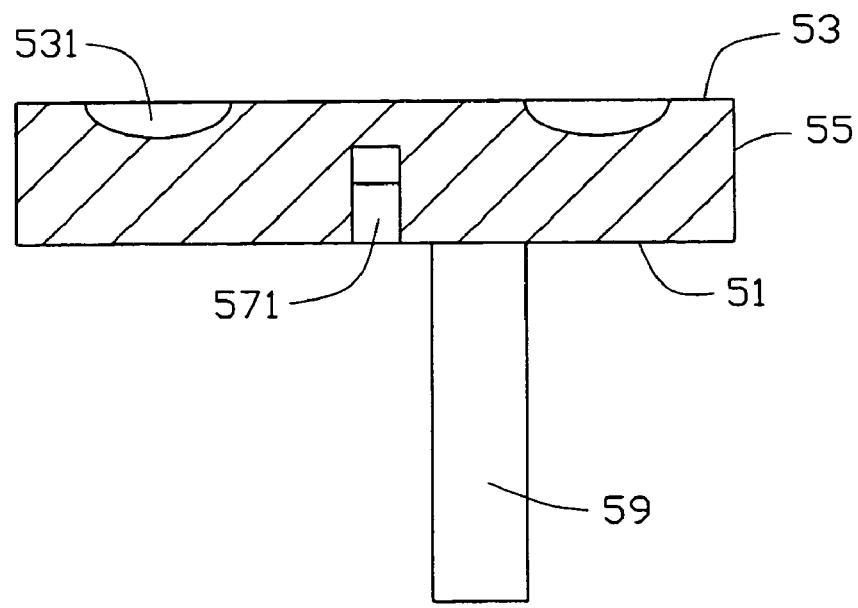
FIG. 6 is a cross-sectional view of FIG. 4, taken along the line VI-VI thereof.

Referring to FIG. 6, the core insert 50 defines four upper half molding cavities 531 adjacent to the lower end surface 53. The four upper half molding cavities 531 run through the lower end surface 53 adjacent to the secondary flow passages 57.

The core insert 50 has two adjusting poles 59 connected perpendicularly to the upper end surface 51. When the core insert 50 is received in the cylindrical receiving cavity 331 of the upper mold 30, the adjusting poles 59 pass though the two adjusting holes 313 so that the core insert 50 is rotatable in the cylindrical receiving cavity 331 and is movable along an axis of the core insert 50.

Referring also to FIG. 2, the lower mold 70 is substantially a cuboid, including a first surface 71, an opposite second surface 73, and a plurality of third side surfaces 75. The lower mold 70 defines four lower half molding cavities 711 adjacent to the first surface 71. The four lower half molding cavities 711 run through the first surface 71.

Figure 7:
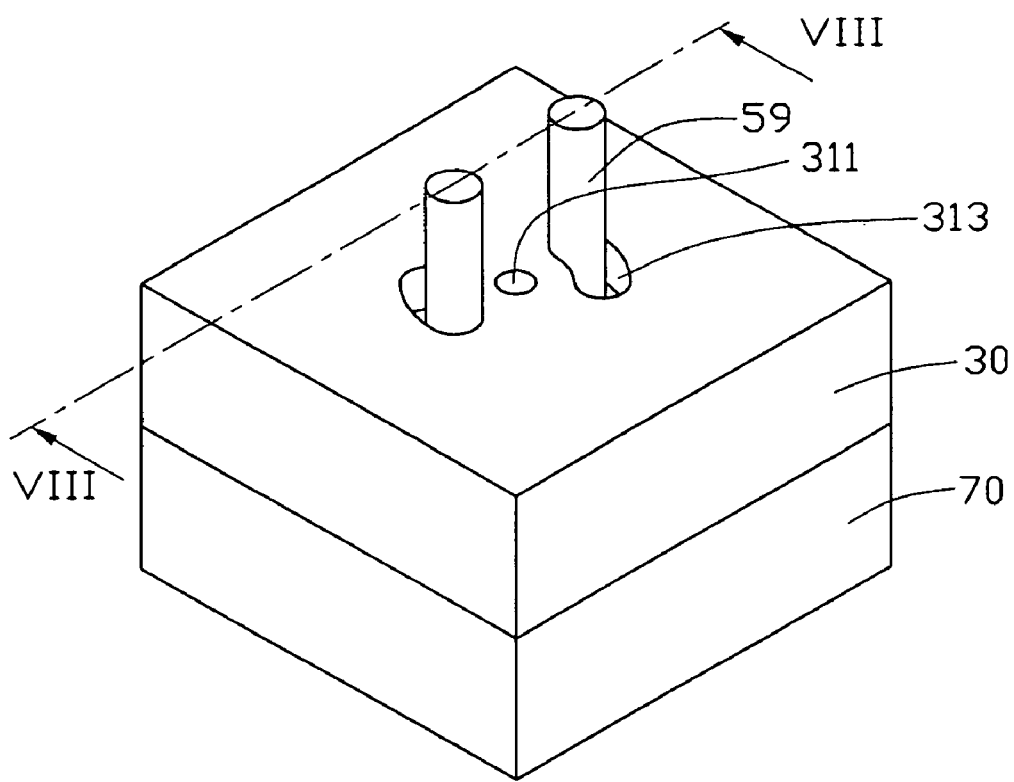
FIG. 7 is an assembled, isometric of view of the injection molding device shown in FIG. 2.

Referring to FIG. 7, in assembly, the core insert 50 is received in the cylindrical receiving cavity 331 of the upper mold 30, and the adjusting poles 59 pass though the two adjusting holes 313, then the upper mold 30 together with the core insert 50 are mounted on the lower mold 70 in a manner such that the upper mold 30 and the lower mold 70 are separable from each other. When the injection molding device 300 is assembled, the core insert 50 and the upper mold 30 cooperatively define a receiving space 80 (shown in FIG. 8), the four upper half molding cavities 531 and their corresponding lower half molding cavities 711 cooperatively define four full molding cavities 90 (shown in FIG. 11).

Figure 8:
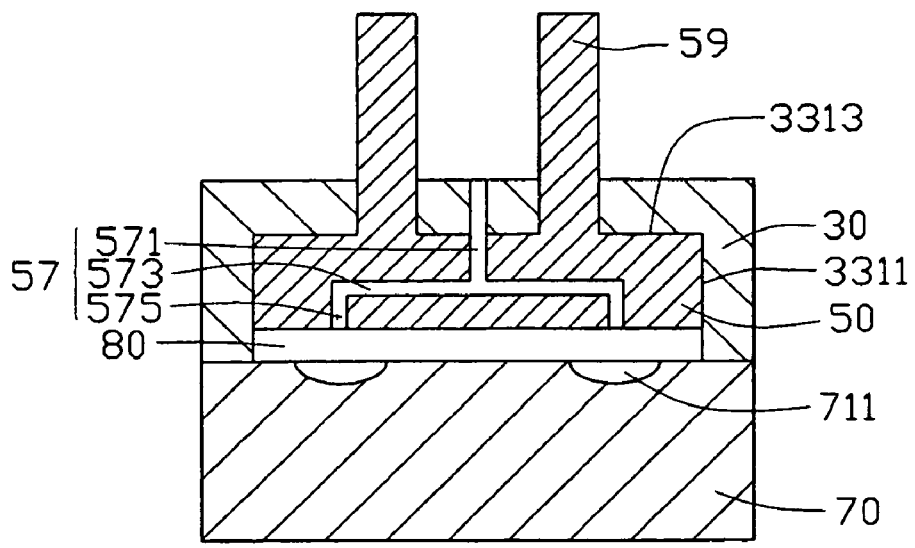
FIG. 8 is a cross-sectional view of FIG. 7, taken along the line VIII-VIII thereof.

In use, referring to FIG. 8, the adjusting poles 59 are pulled along the direction towards the upper wall 31 so that the upper end surface 51 of the core insert impinges on the round bottom surface 3313 in the cylindrical receiving cavity 331. The adjusting poles 59 are moved along the two adjusting holes 313 so that each of the feed passage portions 575 aims at one of the lower half molding cavities 711. At this time, the injection molding device 300 is in an offsetting state, where the secondary flow passage 57 aims at the lower half molding cavities 711 and the lower half molding cavities 711 offset relative to the upper half molding cavities 531. Molten plastic is injected into the main flow passage 311 by an injection molding machine (not shown). The molten plastic flows into the receiving space 80 and the lower half molding cavities 711 via the upright passage portions 571, the horizontal passage portions 573, and the feed passage portions 575.

Figure 9:
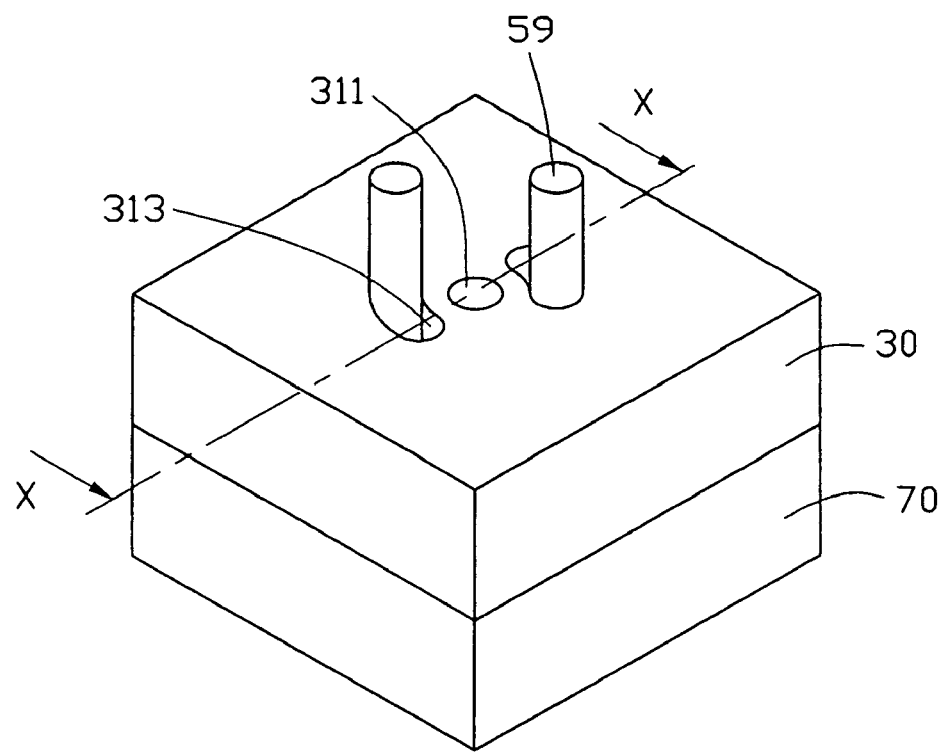
FIG. 9 is an assembled, isometric of view of the injection molding device, showing a first state.
Figure 10:
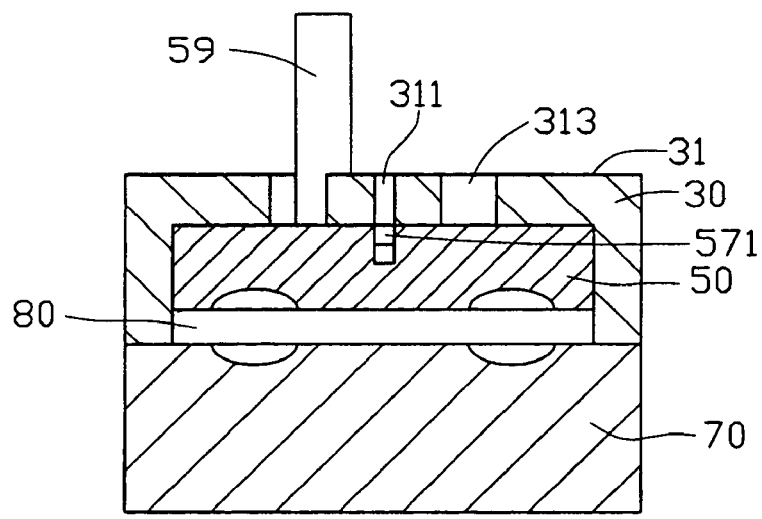
FIG. 10 is an cross-sectional view of FIG. 9, taken along the line X-X thereof.
Figure 11:
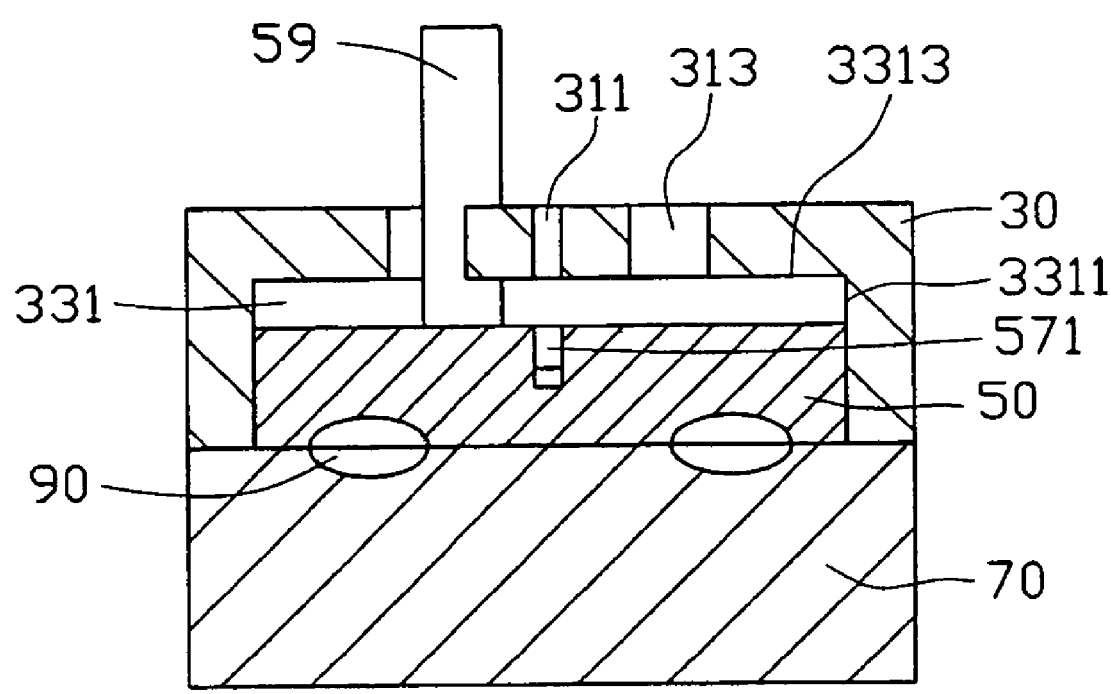
FIG. 11 is similar to FIG. 10, but showing a second state.

Referring to FIG. 9-11, when the receiving space 80 is full of molten plastic, the injection of molten plastic ceases and the adjusting poles 59 are moved again along the two adjusting holes 313 so that each of the four upper half molding cavities 531 aims at a corresponding one of the lower half molding cavities 711. At this time, the injection molding device 300 is in an aligning state, where the secondary flow passage 57 aims at an upper surface of the lower mold 70 adjacent to the lower half molding cavities 711, and the lower half molding cavities 711 aim at the upper half molding cavities 531. The core insert 50 is then moved toward the lower mold until contacting an upper surface of the lower mold, thus forming the full molding cavities 90. Simultaneously, the molten plastic is pushed out away from the receiving space thus completing the filling of the molding cavities 90. The molten plastic in the molding cavities 90 then solidifies, forming plastic lenses which can then be taken out by moving the upper mold 30 together with the core insert 50 away from the lower mold 70.

In the embodiment as illustrated above, because the core insert 50 of the injection molding device 300 has adjusting poles 59 for adjusting the position of the core insert 50, and defines feed passage portions 575 which do not communicate with each other, when the adjusting poles 59 are rotated to one end of the two adjusting holes 313, each of the feed passage portions 575 aims at one of the lower half molding cavities 711. Therefore, the molten plastic can be injected into the lower half molding cavities 711 in a middle position thereof, thus the molten plastic in the molding cavities can have an even cooling rate throughout, and plastic lenses formed in the full molding cavities 90 are symmetrical. When the receiving space 80 is full of molten plastic, the adjusting poles 59 can be moved to an opposite end of the two adjusting holes 313, where each of the four upper half molding cavities 531 aims at one of the lower half molding cavities 711 and does not communicate with the feed passage portions 575. Therefore, the injection molding device 300 does not form gate, and the plastic lenses can be precision-formed in the full molding cavities 90.

In an alternate embodiment, the core insert is integrally made with the upper mold 30, accordingly, the upper mold defines a plurality of the secondary flow passages communicating with the main flow passage, and each of the secondary flow passages aims at one of the upper half molding cavities therein. In another alternate embodiment, the four horizontal passage portions and the four feed passage portions of the secondary flow passage are omitted, accordingly, the upright passage portion runs perpendicularly through the lower end surface.

It is believed that the embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

I claim:

1. An injection molding device, comprising:
   an upper mold defining a main flow passage and a receiving cavity communicating with the main flow passage, and further defining two adjusting holes adjacent to the main flow passage;
   a core insert received in the receiving cavity and comprising two adjusting poles passing through the two adjusting holes so that the core insert is rotatable relative to the receiving cavity and is movable along an axis of the core insert, the core insert defining a secondary flow passage communicating with the main flow passage, and four upper half molding cavities; and a lower mold defining four lower half molding cavities corresponding to the upper half molding cavities and cooperating with the upper half molding cavities to form a full molding cavity.

2. The injection molding device as claimed in claim 1, wherein two adjusting holes each have an arc-shaped cross-section.

3. The injection molding device as claimed in claim 2, wherein the core insert comprises an upper end surface, a lower end surface and a round side surface, the two adjusting poles connecting perpendicularly to the upper end surface.

4. The injection molding device as claimed in claim 3, wherein the secondary flow passage has an upright passage portion running through the middle of the upper end surface, four horizontal passage portions parallel to the lower end surface, each horizontal passage portion communicates with one end of the upright passage portions, four feed passage portions run through the lower end surface and each feed passage portions communicates with one of the horizontal passage portions.

5. The injection molding device as claimed in claim 4, wherein the four upper half molding cavities are located adjacent to the lower end surface, the four upper half molding cavities run through the lower end surface and do not communicate with the secondary flow passages.

6. The injection molding device as claimed in claim 5, wherein the lower mold is substantially a cuboid, including a first wall, an opposite second surface, and a plurality of third side surfaces.

7. The injection molding device as claimed in claim 6, wherein the four lower half molding cavities are located at adjacent to the first surface and the lower half molding cavities runs through the first wall.

8. An injection molding device comprising:
an upper mold defining a main flow passage and two adjusting holes adjacent to the main flow passage;
a lower mold coupled to the upper mold in such a manner as to allow their separation, a receiving cavity being cooperatively formed between the upper and lower mold, the lower mold defining a lower half molding cavity in communication with the receiving cavity; and
a core insert received in the receiving cavity, the core insert defining an upper half molding cavity in communication with the receiving cavity and a secondary flow passage communicating the main flow passage with the receiving cavity, the core insert comprising two adjusting poles connected perpendicularly to the upper end surface for passing through the two adjusting holes so that the core insert is rotatable in the receiving cavity and is movable along an axis of the core insert, wherein after the core insert being assembled between the lower mold and the upper mold, the core insert is configured to be movable relative to the receiving cavity so as to allow the lower half molding cavity and the upper half molding cavity to cooperatively form a full molding cavity.

9. An injection molding device comprising:
an upper mold defining a main flow passage;
a lower mold coupled to the upper mold in such a manner as to allow their separation, a receiving cavity being cooperatively formed between the upper and lower mold, the lower mold defining a lower half molding cavity in communication with the receiving cavity; and
a core insert received in the receiving cavity, the core insert defining an upper half molding cavity in communication with the receiving cavity and a secondary flow passage communicating the main flow passage with the receiving cavity, wherein after the core insert being assembled between the lower mold and the upper mold, the core insert is configured to be manually adjusted to move in the receiving cavity so as to allow the lower half molding cavity to move towards the upper half molding cavity from an offsetting state to an aligning state, wherein the offsetting state is where the secondary flow passage aims at the lower half molding cavity and the lower half molding cavity offsets relative to the upper half molding cavity, and the aligning state is where the secondary flow passage aims at an upper surface of the lower mold adjacent to the lower half molding cavity, and the lower half molding cavity aims at the upper half molding cavity.

10. The injection molding device as claimed in claim 9, wherein the upper mold further defines two adjusting holes adjacent to the main flow passage and the two adjusting holes each have an arc-shaped cross-section, the core insert has two adjusting poles connected perpendicularly to the upper end surface for passing through the two adjusting holes so that the core insert is rotatable in the receiving cavity and is movable along an axis of the core insert.

11. The injection molding device as claimed in claim 10, wherein the upper mold includes an upper wall and a plurality of side walls connecting to the upper wall so as to define the receiving cavity, and the main flow passage runs through the upper wall.

12. The injection molding device as claimed in claim 11, wherein the core insert has a lower end surface, the upper half molding cavity runs through the lower end surface and does not communicate with the secondary flow passages.

* * * * *